(No Model.)  2 Sheets—Sheet 1.

F. ROSS & A. FRANZEN.
MOTOR FOR ELECTRIC REGULATING APPARATUS.

No. 421,195.  Patented Feb. 11, 1890.

WITNESSES  
A. B. Blackwood  
M. Smith

INVENTORS  
Fredrick Ross  
Asmus Franzen  
by Connolly Bros  
attys (No Model.) 2 Sheets—Sheet 2.

F. ROSS & A. FRANZEN.
MOTOR FOR ELECTRIC REGULATING APPARATUS.

No. 421,195. Patented Feb. 11, 1890.

WITNESSES.
Albert B. Blackwood
W. Clabaugh

INVENTORS.
Friedrich Ross
Asmus Franzen
By Connolly Bros
Attys

UNITED STATES PATENT OFFICE.

FRIEDRICH ROSS AND ASMUS FRANZEN, OF VIENNA, AUSTRIA-HUNGARY.

MOTOR FOR ELECTRIC REGULATING APPARATUS.

SPECIFICATION forming part of Letters Patent No. 421,195, dated February 11, 1890.

Application filed October 20, 1887. Serial No. 252,926. (No model.)

*To all whom it may concern:*

Be it known that we, FRIEDRICH ROSS and ASMUS FRANZEN, subjects of the Emperor of Germany, and residents of Vienna, in the Empire of Austria-Hungary, have invented certain new and useful Improvements in Motors for Electric Regulating Apparatus, of which the following is a specification.

This invention relates to an improved motor for electric regulating apparatus, and has for its object to impart to the part to be governed, or to some intermediate part suitably connected therewith, the requisite movement in a direct and positive manner.

Figure 1:
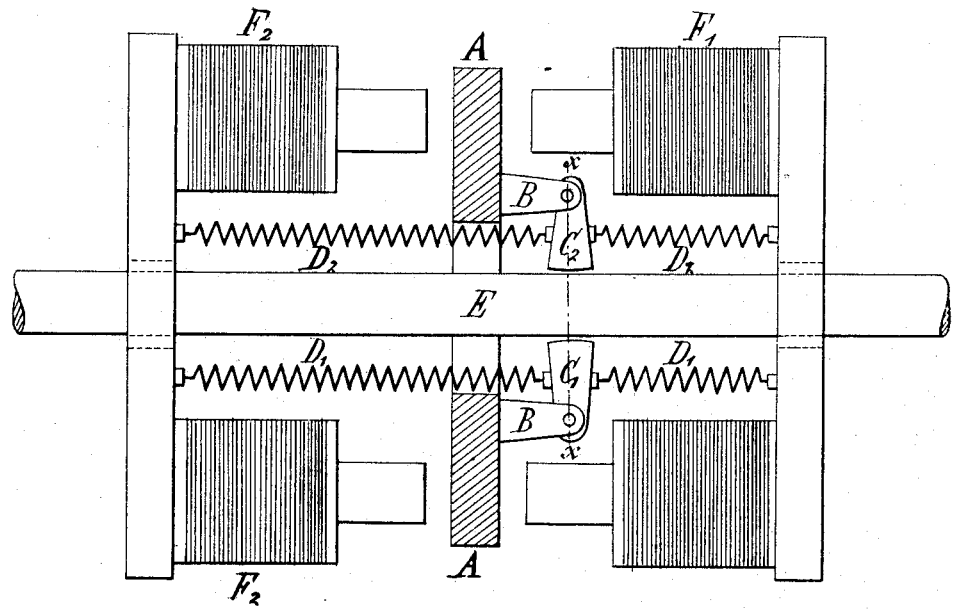
Figure 2:
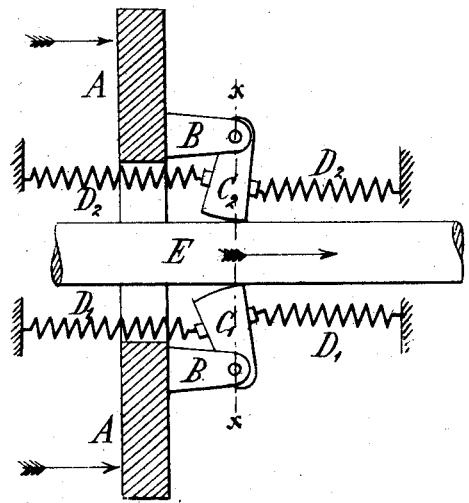
Figure 3:
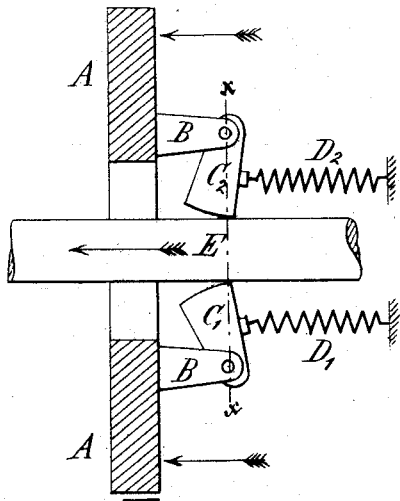
Figure 4:
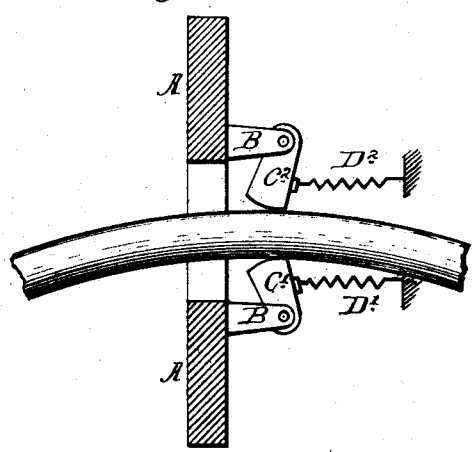

In the accompanying drawings, Figure 1 is an elevation, partly in section, of our improved apparatus in its normal position. Fig. 2 is a similar view showing a different position of the said apparatus. Fig. 3 shows a modification of our said invention. Fig. 4 shows another modification.

A A, Fig. 1, is a plate having two projections B B secured thereto, to which grippers $C'$ $C^2$ are pivoted. The grippers are normally held by springs $D'$ $D'$ $D^2$ $D^2$ in the position shown in Fig. 1, (marked $x$ $x$.)

Between the grippers $C'$ $C^2$ is a rod E, forming a part of or connected with the part actuating the regulating devices, arranged so as to be entirely clear of the grippers $C'$ $C^2$ when they are in their normal position, as shown in Fig. 1. Now, when the plate A A moves in a direction parallel to the axis of rod E the springs $D'$ $D^2$ will tend to maintain the grippers $C'$ $C^2$ in their original position, while the fulcrums B B of said grippers move along with the plate A A, thereby causing the grippers to assume the inclined position shown in Fig. 2 and to bear against the rod E, thus causing it to move in the same direction as the plate A A. When the plate A A returns into its normal position, the rod E will be released from the grippers; but if the plate A A continues its movement in the opposite direction the rod E will again be moved in the same direction as the plate A A—that is to say, in a direction opposite to that in which it is moved in Fig. 2—the position of the grippers being then reversed. If it is desired to move the rod E in one direction only, the grippers $C'$ $C^2$ are shaped as shown in Fig. 3, so that they impinge against the rod E only when the plate A A is moved in the direction of the arrow, Fig. 3.

Instead of the rectilinear movement of the rod E, as hereinbefore described, we may obtain a circular movement for actuating the regulating devices by employing a ring or angular piece instead of a straight rod E.

The reciprocating movement of the plate A A may be obtained by two electro-magnets $F'$ $F^2$, the plate A A then forming the armature. Instead of electro-magnets, solenoids might be employed.

The movement of the rod E obtained as above described may in various ways be utilized for regulating purposes. Thus it may be connected with a series of rubbing-contacts either directly or through the medium of any suitable mechanical gear, so that by the movement of the rod E resistances are thrown into or out of circuit in which a uniform intensity of current has to be maintained. The electro-magnets or solenoids $F'$ $F^2$, forming part of or being connected with the said circuit or the rubbing-contacts above mentioned, may be connected with sources of electricity or with bodies capable of inducing electric current in the circuit to be regulated, so that by the movement of the rod E a uniform difference of potential in the latter circuit is maintained; or, the rod E may be coupled directly or through the medium of an intermediate gear with suitable mechanical devices for regulating the motion of the engine or motor driving the dynamo or other device connected with the electro-magnets or solenoids $F'$ $F^2$.

We claim—

1. In an electromotor, the combination, with an electro-magnet, of a smooth-faced reciprocating rod having a rectilinear movement in the direction of the polar axis of the magnet and a single armature spanning both poles of the magnet and provided with pivotal gripping-jaws and restraining-springs, whereby as said armature is attracted toward its magnet said rod will be grasped or gripped and moved in the same direction, substantially as described.

2. In an electromotor or electro-magnetic apparatus for communicating step-by-step feed motions to a rod, the combination, with two opposite electro-magnets, of an intervening armature provided with pivotal gripping-jaws, springs connecting said gripping-jaws to stationary supports, and a rod or bar passing through said armature and between the gripping-jaws, substantially as described.

3. In an electromotor, the combination, with suitable electro-magnets, of a reciprocating armature spanning both poles of the magnet, a pair of gripping-jaws pivotally attached to said armature, springs connecting said jaws to stationary supports, and a longitudinally-movable rod passing through said armature and between said jaws, substantially as described.

In testimony whereof we have affixed our signatures in presence of two witnesses.

F. ROSS.
A. FRANZEN.

Witnesses:
J. G. MOELLER,
T. G. HARDY.